United States Patent [19]

Peeters et al.

[11] Patent Number: 5,629,359

[45] Date of Patent: May 13, 1997

[54] RADIATION CURABLE COMPOSITIONS

[75] Inventors: Stephan Peeters, Heverlee; Ivan Vanden Eynde, Keerbergen; August Van Gysel, Dilbeek; Jean-Marie Loutz, Brussels, all of Belgium

[73] Assignee: U C B S.A., Brussels, Belgium

[21] Appl. No.: 452,293

[22] Filed: May 26, 1995

[30] Foreign Application Priority Data

May 31, 1994 [GB] United Kingdom ............ 9410867

[51] Int. Cl.$^6$ ............................................. C08F 2/46
[52] U.S. Cl. ............................................. 522/96
[58] Field of Search ............................................. 522/96

[56] References Cited

FOREIGN PATENT DOCUMENTS

| 5-80279 | 4/1993 | Japan . |
| 5-150197 | 6/1993 | Japan . |
| 1404989 | 9/1975 | United Kingdom . |

*Primary Examiner*—Mark Chapman
*Attorney, Agent, or Firm*—Wenderoth, Lind & Ponack

[57] ABSTRACT

Radiation curable compositions, comprising, per 100 parts by weight, (a) at least 20 parts by weight of at least one radiation polymerizable compound containing at least two groups selected from $CH_2=CH-COO-$ and $CH_2=C(CH_3)-COO-$ and (b) at least 5 parts by weight of at least one (2-oxo-1-pyrrolidinyl)alkyl acrylate or methacrylate of the formula:

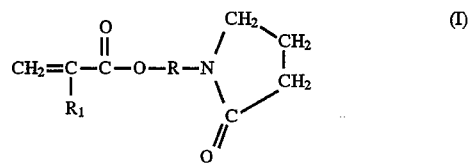

wherein R represents an alkylene radical containing 2 to 4 carbon atoms and $R_1$ represents a hydrogen atom or a methyl radical.

These radiation curable compositions exhibit a high speed of curing by ultraviolet irradiation or by an accelerated electron beam, and are suitable for the production of coatings with excellent qualities such as good adhesion to the most diverse substrates, a high surface hardness, an improved abrasion resistance and chemical resistance, and good mechanical properties.

20 Claims, No Drawings

RADIATION CURABLE COMPOSITIONS

The present invention relates to new radiation curable compositions comprising a (2-oxo-1-pyrrolidinyl)alkyl acrylate or methacrylate as a reactive diluent. These compositions exhibit a high speed of curing by ultraviolet irradiation, or by an accelerated electron beam, and are suitable for the production of coatings with excellent qualities, such as a good adhesion to the most diverse substrates, a high surface hardness, an improved abrasion resistance and chemical resistance, and good mechanical properties.

Compositions curable by ultraviolet rays or by accelerated electron beams have already been described in numerous publications such as articles and patents. Such compositions have found a wide range of applications in numerous fields, for example, as coatings, varnishes and paints for protecting and decorating the most diverse substrates such as glass, metals, plastics, paper, as printing varnishes and inks curable by ultraviolet rays or as adhesives for laminates, and the like.

Compared with heat curable compositions, radiation curable compositions have many advantages. First of all, these compositions do not contain solvents, contrary to the thermosetting compositions, because their constituents are selected so that they all polymerize almost completely during curing; in this way, an important source of environmental pollution is eliminated. Next, radiation curing requires less energy than the heat required to evaporate the solvents and to cure thermosetting compositions, which represents a significant saving of energy; this mode of curing also has the advantage that it can be performed at low temperature, and thus allows the coating of heat sensitive substrates. Finally, in many applications, radiation curable compositions allow to work at very high production rates and continuously, because these compositions cure in less than 1 second, which is not the case for heat curable compositions. Moreover, these radiation curable compositions often allow to obtain performances that other types of compositions do not allow to achieve.

Radiation curable compositions generally consist of a mixture of the following reactive components:

one or more radiation polymerizable reactive oligomers or prepolymers, the molecular weight of which is generally lower than 10,000 and which have, at the chains ends or laterally along the chain, acrylic, methacrylic, vinyl or alkyl groups. Such oligomers or prepolymers are well known, are available commercially, and have been described for a large variety of structures, such as polyesters, polyacrylics, polyepoxides, polyurethanes, etc. Examples of such radiation polymerizable compounds are epoxy acrylates or methacrylates, such as described in U.S. Pat. Nos. 3,676,398, 3,770,602 and 4,511,732, urethane acrylates or methacrylates, such as described in U.S. Pat. Nos. 3,700,643, 4,133,723 and 4,188,455, polyester acrylates or methacrylates, such as described in U.S. Pat. Nos. 4,206,025 and 5,002,976, and acrylic acrylates or methacrylates, and the like. The reactive oligomers or prepolymers are chosen depending on their film forming properties and on the desired performances (hardness or flexibility, toughness, chemical resistance and weatherability, etc.) of the coatings prepared from the radiation curable compositions.

one or more polyethylenically unsaturated reactive monomers which contain at least two ethylenically unsaturated groups. These reactive monomers are preferably diacrylates or polyacrylates of polyols of low molecular weight, such as for example diacrylates of 1,4-butanediol, of 1,6-hexanediol, of neopentyl glycol, of di-, tri,- and/or tetraethylene glycol, of tripropylene glycol, trimethylolpropane triacrylate or pentaerythritol triacrylate, dipentaerythritol hexaacrylate, etc. The essential role of these reactive monomers is to enable to adjust the viscosity depending on the intended industrial application. Since these monomers contain radiation polymerizable ethylenically unsaturated groups, for example, acrylic groups, they also participate in the radiation curing, and after polymerization, they are permanently part of the final polymeric products obtained. In order to avoid a reduction of the radiation induced curing rate, monomers having acrylic unsaturations are used preferably.

one or more monoethylenically unsaturated reactive monomers which contain only one ethylenically unsaturated group per molecule. Examples of such monomers are the monoacrylates or monomethacrylates of monohydric or polyhydric aliphatic alcohols, styrene, vinyl-toluene, vinyl acetate, N-vinyl-2-pyrrolidone, N-vinylpyridine, N-vinylcarbazole, and the like. These monomers are added to the compositions as reactive diluents in order to lower the viscosity. Thus, by the use of these monofunctional reactive monomers, the viscosity of the compositions can be adjusted at will, which means that no organic solvents are needed, and that all the problems of recovery, intoxication and pollution caused by these solvents are suppressed. These monomers can also have a considerable influence on the physical and chemical properties of the final coatings obtained;

The radiation curable compositions further contain various usual auxiliary constituents needed to adapt them to their specific technical applications and optionally, a photoinitiator generally associated with a tertiary amine which, under the influence of ultraviolet irradiation, produces free radicals which initiate the crosslinking (curing) of the composition, for example, benzophenone, benzil dimethylketal, thioxanthones, and the like.

At the present time, N-vinyl-2-pyrrolidone is very widely used in radiation curable compositions not only because this monofunctional reactive monomer possesses an excellent ability to reduce viscosity, but especially because it confers a very high reactivity to the compositions containing it.

In fact, while it is true that many reactive monomers can be used to adjust the viscosity, only a few of these monomers reduce the viscosity without detrimentally affecting the curing rate of the composition containing them.

N-vinyl-2-pyrrolidone does not have that disadvantage because it increases the curing rate of the composition containing it, while reducing the viscosity. Moreover, this compound is a very valuable reactive diluent because the coatings obtained after radiation curing generally possess a very good chemical and abrasion resistance, combined with excellent adhesion to various substrates (see for example U.S. Pat. No. 4,319,811).

Unfortunately, it has recently been established that N-vinyl-2-pyrrolidone presents toxicity problems. Indeed, a recent chronic toxicity study carried out in the rat, demonstrated that N-vinyl-2-pyrrolidone is carcinogenic at doses of 20 and 10 ppm administered by inhalation over a period of 2 years (J. PERNEL, "Toxicity concerns of UV inks". Polym. Paint. Col. J. 182 (Sep. 16, 1992), No. 4314, pages S9 to S12; MSDS Data Base of "The Canadian Center for Occupational Health and Safety", Access No. 503079). This compound has, moreover, irritating properties for the skin and the eyes, and has an unpleasant odor; therefore, this compound can raise health problems both in the manufacturing and application workshops, not to mention that this compound is relatively expensive.

Thus, there remains a need to find other monofunctional reactive monomers that can be used as reactive diluents in compositions curable by ultraviolet irradiation or by accelerated electron beams and which offer the same advantages as N-vinyl-2-pyrrolidone, as far as the reactivity, the quality of the coatings obtained and the ability to reduce the viscosity are concerned, while avoiding the problems of toxicity, odor and cost.

We have now found that certain (2-oxo-1-pyrrolidinyl) alkyl acrylates and methacrylates are excellent monofunctional reactive monomers and that they can usefully replace N-vinyl-2-pyrrolidone as a reactive diluent in order to reduce the viscosity of radiation curable compositions to the level required by the intended technical application.

We have indeed found that these (2-oxo-1-pyrrolidinyl) alkyl acrylates possess physico-chemical and technological properties as favorable as and, in some instances, even better than N-vinyl-2-pyrrolidone, while avoiding the disadvantages mentioned above.

The present invention accordingly provides a new radiation curable composition comprising, per 100 parts by weight, (a) at least 20 parts by weight of at least one radiation polymerizable compound containing at least two groups selected from $CH_2=CH-COO-$ and $CH_2=C(CH_3)=COO-$, and (b) at least 5 parts by weight of at least one (2-oxo-1-pyrrolidinyl)alkyl acrylate of the general formula

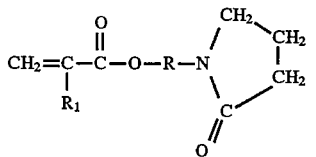

wherein R represents an alkylene radical containing 2 to 4 carbon atoms and $R_1$ represents a hydrogen atom or a methyl radical.

Furthermore, the present invention relates to the use of this radiation curable composition, which contains, as reactive diluent, at least one (2-oxo-1-pyrrolidinyl)alkyl acrylate or methacrylate (b), for the preparation of coatings, varnishes, paints, inks and adhesives for laminates.

According to another aspect, the present invention also relates to a process for coating a substrate which comprises applying to the surface of the said substrate, the aforementioned radiation curable composition in which the (2-oxo-1-pyrrolidinyl)alkyl acrylate or methacrylate (b) is present in an amount sufficient to produce a composition with a viscosity substantially lower than the viscosity of compound (a), and exposing the said composition to ultraviolet irradiation or to an accelerated electron beam for a period of time sufficient to form a cured coating.

The (2-oxo-1-pyrrolidinyl)alkyl acrylates and methacrylates (b) present, according to the present invention, as reactive diluents in the radiation curable compositions, are known products.

For example, in British Patent No. 930,668, the synthesis of these (2-oxo-1-pyrrolidinyl)alkyl acrylates and methacrylates (b) is described, as well as their use for preparing homopolymers and copolymers with other ethylenically unsaturated monomers, useful in the manufacture of coatings, moulding products and plastisols.

In U.S. Pat. No. 2,882,262, the preparation of (2-oxo-1-pyrrolidinyl)alkyl acrylates and methacrylates (b) is also described, where it is noted that these monomers are easily copolymerizable with one or more other compounds containing a single ethylenic unsaturation, to provide polymers with a high molecular weight. These polymers are prepared and applied in a conventional manner in an organic solvent.

However, none of the patents cited above mention the use of these (2-oxo-1-pyrrolidinyl)alkyl acrylates and methacrylates in compositions curable by ultraviolet radiation, or by accelerated electron beam, which compositions have a 100% solids content and contain no organic solvents. Moreover, in these patents, these specific acrylates and methacrylates are never associated with a radiation polymerizable compound containing at least two $CH_2=CH-COO-$ or $CH_2=C(CH_3)-COO-$ groups; they, thus, cannot act as "reactive diluents" as it is the case in the present invention.

Japanese Patent applications No. 80279/93 and 150197/93, describe compositions, intended for the manufacture of soft contact lenses, which contain copolymers prepared from (2-oxo-1-pyrrolidinyl)alkyl methacrylates and other monofunctional (meth)acrylic esters. These compositions can optionally contain from 0.1 to 5% by weight of a crosslinking agent, which is a polyol di- or tri(meth)acrylate. However, in these Japanese Patent applications, the amount of this compound containing two or three $CH_2=CH-COO-$ or $CH_2=C(CH_3)-COO-$ groups is very low and does not exceed 5% by weight with respect to the weight of the polymerizable monomers, in order to avoid impairment of the oxygen permeability and flexibility properties of the soft contact lenses.

Therefore, the inventors of these Japanese Patent applications could not suspect the favorable effect of the (2-oxo-1-pyrrolidinyl)alkyl acrylates and methacrylates as reactive diluents in radiation curable compositions of the type with which the present invention is concerned and which contain at least 20% by weight, and preferably even much more, of a compound containing at least two $CH_2=CH-COO-$ or $CH_2=C(CH_3)-COO-$ groups.

In the general formula I of the (2-oxo-1-pyrrolidinyl)alkyl acrylates and methacrylates used according to the present invention, R represents an alkylene radical having 2 to 4 carbon atoms, such as the $-CH_2CH_2-$, $-CH_2CH_2CH_2-$, $-CH_2CH(CH_3)-$, $-CH_2CH_2CH_2CH_2-$ radical, and the like.

Amongst the (2-oxo-1-pyrrolidinyl)alkyl acrylates and methacrylates of the formula I, 2-(2-oxo-1-pyrrolidinyl) ethyl methacrylate is preferred.

Indeed, the use of this monofunctional compound as reactive diluent in radiation curable compositions offers a series of advantages which can be summarized as follows:
(1) 2-(2-oxo-1-pyrrolidinyl)ethyl methacrylate is an excellent solvent having a high boiling point (128°to 134° C. at a pressure of 3.3 mbars) and a low viscosity (16 mPa.s at 20° C.); it has a remarkable ability to lower the viscosity of radiation curable compositions;
(2) it has a reactivity at least as great as that of N-vinyl-2-pyrrolidone, which means that the viscosity can be adjusted without reducing the curing rate of the composition containing it; for certain compositions, a reactivity greater than the reactivity of N-vinyl-2-pyrrolidone has been found;
(3) after radiation polymerization, it is completely incorporated into the cured composition;
(4) after polymerization with compound(s) (a), it provides a coating exhibiting good mechanical properties (tensile strength, flexibility, surface hardness) and other specific properties such as good resistance to solvents, water and staining, good spreadability, good wettability and good adhesion to all kinds of substrates; these properties are at least as good as those obtained by using N-vinyl-2-pyrrolidone as reactive diluent;

(5) surprisingly, the abrasion resistance of the cured coatings is sometimes even better than that obtained by using N-vinyl-2-pyrrolidone;

(6) 2-(2-oxo-1-pyrrolidinyl)ethyl methacrylate is non-toxic, which is an advantage with respect to N-vinyl-2-pyrrolidone; the LD 50 by the oral and skin routes, determined in the rat, are greater than 2,000 mg/kg;

(7) it is less irritating to the skin than N-vinyl-2-pyrrolidone;

(8) it is not mutagenic (AMES test), nor is it carcinogenic, unlike N-vinyl-2-pyrrolidone;

(9) it has no odor and is non polluting, since it has a very low vapor pressure at the temperature at which the compositions according to the invention are used;

(10) due to the advantageous properties of 2-(2-oxo-1-pyrrolidinyl)ethyl methacrylate, it can be used as a reactive diluent, to replace N-vinyl-2-pyrrolidone in all existing compositions curable by UV radiation or by accelerated electron beam.

The use of (2-oxo-1-pyrrolidinyl)alkyl acrylates and methacrylates (b) as reactive diluents in the radiation curable compositions is thus very well suited for replacing N-vinyl-2-pyrrolidone.

According to the intended applications, the radiation curable compositions contain 5 to 50 parts by weight of at least one (2-oxo-1-pyrrolidinyl)alkyl acrylate or methacrylate (b) per 100 parts by weight of composition according to the present invention.

The new radiation curable compositions contain as other essential component one or more radiation polymerizable compounds (a) containing at least two groups selected from $CH_2=CH-COO-$ and $CH_2=C(CH_3)-COO-$.

A wide range of compounds (a) containing two or more groups selected from $CH_2=CH-COO-$ and $CH_2=C(CH_3)-COO-$ can be used in the radiation curable compositions according to the invention.

Compounds (a) can be either low molecular weight compounds, or high molecular weight compounds and they can contain 2 to 15, preferably 2 to 6 $CH_2=CH-COO-$ and/or $CH_2C(CH_3)COO-$ groups per molecule. These compounds (a) can be present in the new radiation curable compositions either alone, or in admixture with other saturated and/or unsaturated oligomers and/or polymers. In general, all monomers, oligomers or prepolymers containing at least two $CH_2=CH-COO-$ and/or $CH_2C(CH_3)COO-$ groups, conventionally used for the preparation of radiation curable compositions, may be used; the type and choice of these compounds depends in particular on the intended technical application of the composition and is well known to those skilled in the art. To adjust the viscosity in order to adapt the composition to various technical applications, it is often advantageous to mix a viscous saturated or unsaturated oligomer or prepolymer having a high molecular weight with one or more low molecular weight compounds.

Compounds (a) having a low molecular weight include the acrylic or methacrylic acid esters of polyhydric alcohols containing 2 to 6 hydroxyl groups. Examples of compounds (a) having a low molecular weight are as follows: diacrylates and dimethacrylates of ethylene glycol, of di-, tri-, tetra- or polyethylene glycols, of di-, tri-, polypropylene glycols, of butanediol, of hexanediol, of neopentyl glycol, of oxyethylated or oxypropylated bisphenol A, the triacrylates and trimethacrylates of trimethylolethane, of trimethylolpropane or of glycerol, the tetraacrylates and tetramethacrylates of pentaerythritol or of ditrimethylolpropane, the hexaacrylates or hexamethacrylates of dipentaerythritol, etc. Acrylates and methacrylates of the oxyethylation or oxypropylation products of these polyalcohols can also be used.

Compounds (a) having a relatively high molecular weight include oligomers or prepolymers whose molecular weight is less than 10,000 and which contain at least two $CH_2=CH-COO-$ and/or $CH_2C(CH_3)COO-$ groups at the chain ends or laterally along the chain. Such oligomers or prepolymers are well known and have been described for example in the book entitled "UV & EB Curing Formulations for Printing Inks, Coatings and Paints", Ed. R. HOLMAN & P. Oldring, Publ. by SITA-Technology, London SW18, 1988, Second Impression, Chapter II, pages 19 to 46.

A category of oligomers which can be used in the compositions according to the invention consists of the polyester acrylates and methacrylates. These polyester acrylates and methacrylates can be obtained in a conventional manner by first preparing a polyester by polycondensation of at least one mono- and/or polyhydroxy alcohol (ethylene glycol, propylene glycol, butanediol, neopentyl glycol, hexanediol, trimethylolpropane, possibly hydrogenated or oxyalkylated bisphenol A, pentaerythritol, etc.) with at least one mono- and/or polycarboxylic acid (adipic cid, phthalic acid, isophthalic acid, terephthalic acid, trimellitic acid, etc.), and by then reacting for example a hydroxyl group-containing polyester with acrylic or methacrylic acid, or, by reacting a carboxyl group-containing polyester with a hydroxyalkyl acrylate or methacrylate (2-hydroxyethyl acrylate, 3-hydroxypropyl acrylate, 2-hydroxyethyl methacrylate, etc.) or with glycidyl methacrylate. By using unsaturated compounds for the polyester synthesis, such as for example fumaric acid, maleic acid, itaconic acid, etc., polyesters bearing both acrylic or methacrylic unsaturations and ethylenic unsaturations in the polymer chain, can be obtained. It is also possible to use polyesters which contain halogen atoms attached to carbon atoms having the electronic configuration $sp^2$.

Another category of oligomers that can be used according to the invention includes the urethane acrylates and methacrylates, which can be prepared, for example, by reacting a diisocyanate or polyisocyanate (hexamethylene-diisocyanate, isophorone-diisocyanate, toluene-diisocyanate, etc.) with a hydroxyalkyl acrylate or a hydroxyalkyl methacrylate. Use can be made exclusively of hydroxyalkyl acrylates or of hydroxyalkyl methacrylates such as those mentioned above, but in order to extend the chain, mono- or polyhydroxy alcohols can also be added, such as those mentioned above, for the synthesis of polyesters containing acrylic or methacrylic unsaturations, or else polyesters or polyethers containing hydroxyl groups can be added to provide, respectively, polyester urethanes or polyether urethanes containing acrylic or methacrylic unsaturations. Preferably, these urethane acrylates and methacrylates have a molecular weight of less than 5,000.

Another category of oligomers which can be used according to the invention includes the epoxy acrylates and methacrylates, which can be obtained by reacting acrylic acid, methacrylic acid or any other compound containing an acid group and a $CH_2=CH-COO-$ or $CH_2C(CH_3)COO-$ group, possibly mixed with an unsaturated acid, with aliphatic, cycloaliphatic or aromatic epoxy compounds, such as bisphenol A diglycidyl ether, hydrogenated or not, diglycidyl ethers of butanediol, of neopentylglycol or of pentaerythritol, or else with epoxidized unsaturated fatty acid triglycerides or epoxidized novolacs. Examples include epoxidized soya oil tri- and tetraacrylate,
epoxidized castor oil triacrylate,
epoxidized linseed oil tetra- and pentacrylate,
epoxidized tung (or China wood) oil tetra- and pentacrylate.

A further category of oligomers that can be used according to the invention includes acrylic acrylates or methacrylates, which can be obtained by first preparing a (meth)acrylic copolymer by copolymerization of acrylic or methacrylic monomers such as butyl acrylate, 2-ethylhexyl acrylate and methyl methacrylate with monomers containing pendant acid, anhydride, hydroxy or glycidyl groups and by then reacting this copolymer with an unsaturated monomer. For example, a glycidyl group-containing copolymer can first be prepared by copolymerizing functionalized monomers such as glycidyl acrylate or methacrylate with other acrylic monomers, the said glycidyl group-containing polymer being reacted in a second step with acrylic or methacrylic acid; conversely, when the functionalized monomers are acrylic or methacrylic acid, the carboxyl group-containing polymer is reacted in the second step with glycidyl acrylate or methacrylate, etc.

As explained above, compounds (a) according to the invention can be used either alone, or in admixture with one or more saturated or unsaturated oligomers or polymers, other than compound (a). Examples of such other oligomers or polymers which may also be present in the radiation curable compositions include alkyl polyacrylates, alkyl polymethacrylates, (meth)acrylic copolymers, saturated or unsaturated polyesters or else halogenated polyesters such as described in U.S. Pat. Nos. 4,134,811 and 4,134,814, etc.

Preferably, in this embodiment of the invention, oligomers or polymers such as saturated or unsaturated polyesters, halogenated polyesters, (meth)acrylic polymers, are used in admixture with one or more compounds (a) having a low molecular weight, i.e. acrylic or methacrylic acid esters of polyhydric alcohols containing 2 to 6 hydroxyl groups, numerous examples of which have been mentioned above, and which are used as reactive diluents.

Compound (a) is essential in the radiation curable compositions according to the invention. It contributes to polymerization reactivity as a result of ultraviolet radiation or bombardment with accelerated electrons, due to the presence of multiple acrylic or methacrylic unsaturations, as well as to hardness, flexibility, adhesion to substrates, solvent resistance and weatherability of the coatings prepared from these compositions.

According to the intended applications, the radiation curable compositions contain 20 to 95 and preferably 35 to 95 parts by weight of compound (a) containing at least two $CH_2=CH—COO—$ and/or $CH_2=C(CH_3)—COO—$ groups per 100 parts by weight of composition according to the invention.

Furthermore, the compositions according to the invention can contain various conventional auxiliary constituents, which are necessary for adapting them to the technical applications mentioned above. These auxiliary constituents can be selected from
additives,
fillers and
pigments or dyes.

For curing the compositions according to the invention by an accelerated electron beam, it is not necessary to use a photoinitiator, since this type of radiation produces by itself a sufficient quantity of free radicals to ensure that curing is extremely rapid. On the other hand, when the compositions according to the invention are cured with radiation whose wavelength is between 200 and 500 nanometers (ultraviolet radiation), the presence of at least one photoinitiator is required.

Photoinitiators which may be used according to the present invention are selected from those conventionally used for this purpose.

Suitable photoinitiators include aromatic carbonyl compounds such as benzophenone and its alkyl or halogen derivatives, anthraquinone and its derivatives, thioxanthone and its derivatives, benzoin ethers, aromatic or non-aromatic alpha-diones, benzil dialkylketals and acetophenone derivatives.

Suitable photoinitiators are, for example, acetophenone, propiophenone, 2-phenyl-acetophenone, 2-chloro-2-phenyl-acetophenone, 2,2-dichloro-2-phenyl-acetophenone, 2-butyloxy-2-phenyl-acetophenone, 2,2-dimethoxy-2-phenyl-acetophenone, 2,2-diethoxy-acetophenone, 2-methylol-2-methoxy-2-phenyl-acetophenone, benzophenone, 4-trichloromethylbenzophenone, indenone, 1,3-indanedione, fluorenone, xanthone, thioxanthone, 2-chlorothioxanthone, anthraquinone, 2-ethylanthraquinone, biacetyl, glyoxal, 1,2-indanedione, p-chlorophenyl-glyoxal, benzil, camphoquinone, benzoin methyl and ethyl ethers, and the like.

The photoinitiating action of the photoinitiator is, in some cases, considerably improved by tertiary amines characterized in that they have at least one hydrogen atom on the carbon atom adjacent to the nitrogen atom. Suitable tertiary amines are: trimethylamine, triethanolamine, N-methyl-diethanolamine, N-N-dimethyl-ethanolamine, N,N-dimethylstearylamine, N,N-dimethylaniline, N,N-di(2-hydroxyethyl)aniline or aminoacrylates such as the addition product of a secondary amine such as dimethylamine, diethylamine, diethanolamine, etc., with a polyol acrylate such as trimethylolpropane diacrylate, etc.

It can be advantageous in certain cases to associate, in the same molecule, the tertiary amine function having at least one hydrogen atom on at least one carbon atom adjacent to the nitrogen atom, with the aromatic ketone function, such as, in for example: 2-isopropyloxy-2-(4-dimethylaminophenyl)propiophenone, 4-dimethylamino-benzophenone, 4,4'-bis(dimethylamino)benzophenone, 2-diethylamino-9-fluorenone, 7-diethylamino-4-methylcoumarin, N-methylacridone, and the like. Similarly, it is possible to associate in the same molecule the tertiary amine function, having at least one hydrogen atom on at least one carbon atom adjacent to the nitrogen atom, with at least one acrylic or methacrylic radical, such as in, for example: the mono-, di- and triacrylates or methacrylates of triethanolamine, of N-methyldiethanolamine, of N,N-dimethylethanolamine or of N,N-di(2-hydroxyethyl)aniline.

The compositions according to the present invention contain 0 to 15 and, preferably, 0.2 to 10 parts by weight of a photoinitiator per 100 parts by weight of composition according to the invention.

As examples of additives, the following may be mentioned:
known viscosity modifying agents or thixotropic agents,
solvents in very small quantities in order to obtain specific performances, for example good adhesion to a polycarbonate substrate,
known antifoaming agents,
known flow agents,
polymerization inhibitors intended to ensure storage stability, for example quinones, hydroquinones, substituted phenolic derivatives,
wetting agents for ensuring good wettability of pigments,
slip agents, and the like.

According to the intended applications, the compositions according to the invention contain 0 to 10, preferably 0 to 5 parts by weight of such additives per 100 parts by weight of composition according to the invention.

The fillers used in the radiation curable compositions according to the invention can be transparent to ultraviolet rays, which means that they have a minimal absorption at wavelengths of 200 to 500 nanometers of the spectrum, such as for example precipitated or micronized calcium or magnesium carbonate (calcite, aragonite, or the like.), barium or calcium sulfate (barytes, blanc fixe, and the like), micronized hydrated potassium or magnesium silicoaluminate, micronized magnesium silicate, precipitated alumina hydrate, asbestine, micronized or non micronized talc. However, it is also possible to use opacifying inorganic pigments, such as titanium, zinc, iron or chromium oxides, zinc or cadmium sulfides, manganese or ammonium phosphates, cobalt aluminares, etc., provided that a higher irradiation energy is used, for example a higher number of UV radiators.

According to the intended applications, the compositions according to the invention contain 0 to 50 parts by weight of fillers per 100 parts by weight of composition according to the invention.

The pigments or dyes are added to the compositions according to the invention in order to impart the desired coloring properties. These dyes or pigments should neither retard nor inhibit polymerization of the binder; moreover they should not react chemically with the photoinitiator system, nor adsorb the latter. They are preferably selected from the products mentioned in the "Colour Index", the absorption of which in the wavelength range of 200 to 500 nanometers being as low as possible.

According to the intended applications, the compositions according to the invention contain 0 to 40 parts by weight of pigments or dye per 100 parts by weight of composition according to the invention.

If the compositions are intended to be used as varnishes, compounds (a) and (b) are homogeneously mixed with the photoinitiator and the possible additives in a mixer, if necessary with heating when compound (a) is solid or semi-solid, without however exceeding about 90° C. in order to avoid incipient crosslinking; if the viscosity is too high for the intended use, it can be corrected by adding to the composition the adequate amount of a (2-oxo-1-pyrrolidinyl)alkyl acrylate or methacrylate (b).

When the compositions also contain fillers and pigments or dyes, for example, when used as coatings, paints and inks, these fillers and pigments are dispersed in a portion of compounds (a) and (b) in an ordinary mixer, and the mixture is passed on a three-roll mill, possibly with heating as mentioned above, in order to obtain a homogeneous product in which the fillers and pigments are perfectly wetted by the binder. Then, the photoinitiator system and the additives are added, after which the viscosity is adjusted with the remaining portion of compounds (a) and (b). If necessary, the final viscosity of the composition is adjusted with some (2-oxo-1-pyrrolidinyl)alkyl acrylate or methacrylate (b).

The compositions according to the invention are stored in opaque containers, and in cool places to avoid exposure to direct sunlight or through windows.

The compositions according to the invention can be cured with ultraviolet light emitted, for example, by medium pressure mercury vapor UV lamps of at least 80 W/linear cm, preferably fitted with a reflector, or by electrode-less lamps of the type marketed by FUSION SYSTEM, at a distance of about 8 to 50 cm. Other types of lamps can also be used, for example UV-flash lamps, such as those marketed by HENSEL, or pulsed xenon lamps, such as those marketed by IST.

They can also be cured with accelerated electron beams of at least 150 KeV, the power of the equipment used being directly proportional to the thickness of the layer of the composition to be cured.

Using these two radiation sources, the compositions according to the invention cure completely in a time ranging from a fraction of a second to about five seconds. In the following examples, the curing speed is generally expressed by the linear speed with which the composition passes under the radiation source in m/minute. Since the width of the focused UV band is about 2.5 cm, a linear speed of 1.5 m/minute under a UV lamp represents a radiation time of one second. Hence, a speed of 15 m/minute represents a radiation time of 1/10th of a second.

The compositions according to the invention can be applied in a layer having a thickness of several micrometers, using known methods and onto the most varied substrates, such as for example wood, cardboard, paper, textiles, metals of various kinds, plastics such as polycarbonates, poly(meth) acrylates, polyolefins, polystyrenes, polyvinyl chlorides, polyesters, polyurethanes, polyamides, copolymers such as acrylonitrile-butadiene-styrene (ABS) or cellulose acetate-butyrate, and the like.

The compositions which contain the compounds (a) and (b) as binders according to the invention lend themselves to various technical uses, a few non limiting examples of which will now be given.

The compositions may be prepared for use as UV varnishes and as UV marking screen printing inks in the manufacture of printed circuits. These same UV inks may also be used for printing substrates such as paper, cardboard, glass, metal, plastics and artificial leathers (made of polyurethane and PVC), and for marking bottles made from polyethylene, polypropylene, etc. The compositions may also be used as flexographic varnishes and inks and as varnishes to be applied with a roller onto the substrates mentioned above, in particular onto wood, cardboard, rigid and semi-rigid PVC. They can also be used as sealers and as paints which cure at ultra-high speed with an accelerated electron beam for finishing wood, hardboard, chipboard, and the like, in the furniture and building industry. Similarly, they can be used as adhesives in the production of laminates.

The compositions according to the invention benefit from all the advantages associated with this type of products, including a very high curing speed by ultraviolet irradiation or by an accelerated electron beam, and improved abrasion resistance and chemical resistance, without having the disadvantages inherent to this category of compositions.

The mechanical properties of the cured products are excellent, as are their surface hardness, resistance to rubbing, to staining, to water and to solvents, as well as the gloss quality.

With regard to the coatings, varnishes, paints and inks according to the invention, they have the advantage of exhibiting improved adhesion to the most varied substrates. These improved properties are due to the presence of the (2-oxo-1-pyrrolidinyl)alkyl acrylate or methacrylate (b) in the composition according to the invention, physically associated with the polyunsaturated compound (a). As will be shown in the following examples, removal of N-vinyl-2-pyrrolidone and its replacement by compound (b) does not lead to defects such as insufficient reactivity or adhesion; but, on the contrary, improved properties can even sometimes be obtained. Moreover, no ecological problems are encountered either during the manufacturing stage or during the application stage.

Finally, the compositions according to the invention do not contain substances having harmful properties, unlike certain radiation curable compositions which do contain such substances, thus the costs caused by the health measures needed to protect personnel in workshops, both during the manufacture and the use of the said compositions, are reduced.

The following examples are given for the purpose of illustrating the present invention without limiting it. Unless otherwise stated, the parts and percentages given in the examples are expressed by weight.

In these examples, the various compounds used are designated by the following abbreviations and trade names:

HEPMA: (2-oxo-1-pyrrolidinyl)ethyl methacrylate;
HEPA: (2-oxo-1-pyrrolidinyl)ethyl acrylate;
NVP: N-vinyl-2-pyrrolidone
HDDA: 1,6-hexanediol diacrylate;
TPGDA: tripropyleneglycol diacrylate;
OTA 480: triacrylate of the addition product of 3 moles of propylene oxide on 1 mole of glycerol, from UCB S.A.;
Irgacure 500: photoinitiator from Ciba-Geigy Limited. (50/50 mixture of benzophenone and 1-hydroxycyclohexylphenylketone);
Irgacure 184: photoinitiator from Ciba-Geigy Limited. (1-hydroxycyclohexylphenylketone);
Irgacure 651: photoinitiator from Ciba-Geigy Limited. (2,2-dimethoxy-2-phenylacetophenone);
Darocur 1173: photoinitiator from Ciba-Geigy Limited. (2-hydroxy-2-methyl-1-phenylpropane-1-one);
Ebecryl 115: aminoacrylate from UCB S.A.;
Ebecryl 350: silicone diacrylate from UCB S.A. used as a slip agent and surface energy modifying agent.

In these examples, use is made of oligomers representative of the main families of oligomers used in the technical field of radiation curable compositions.

Oligomer No. 1: A solution containing 85% by weight of an aliphatic polyether urethane triacrylate and 15% by weight of HDDA, the polyether urethane triacrylate being prepared from 1 mole of branched polypropylene glycol having a molecular weight of 1,000, 3 moles of isophorone-diisocyanate, and 3 moles of hydroxyethyl acrylate;

Oligomer No. 2: A polyester acrylate with a molecular weight of 900 possessing an average of 4 acrylic unsaturations per chain, the polyester acrylate being prepared from adipic acid, oxypropylated glycerol and acrylic acid;

Oligomer No. 3: A solution containing 88% by weight of an aliphatic urethane diacrylate and 12% by weight of HDDA, the urethane diacrylate having been prepared from 1 mole of caprolactone having a molecular weight of 600, 2 moles of isophorone-diisocyanate and 2 moles of hydroxyethyl acrylate;

Oligomer No. 4: An aromatic polyether urethane diacrylate prepared from 1 mole of polypropylene glycol having a molecular weight of 1000, 2 moles of toluene-diisocyanate and 2 moles of hydroxyethyl acrylate;

Oligomer No. 5: A solution containing 80% by weight of the diacrylate of bisphenol A diglycidyl ether and 20% by weight of HDDA;

Oligomer No. 6: A solution containing 70% by weight of a full acrylic oligomer of molecular weight of 7,000 and 30% by weight of HDDA, the full acrylic oligomer being prepared from butyl acrylate acrylic acid and methyl methacrylate.

EXAMPLE 1

Effect of 2-(2-oxo-1-pyrrolidinyl)ethyl methacrylate on the viscosity of radiation curable compositions In this example, the effect of the addition of increasing amounts of 2-2-oxo-1-pyrrolidinyl)ethyl methacrylate (HEPMA) on the viscosity of conventional radiation curable compositions is shown. This viscosity is measured at 25° C. by means of a Brookfield apparatus without dilution of the compositions. In Table I below, this viscosity is expressed in mPa.s. The compositions are prepared by simply mixing the constituents, with stirring and with gentle heating to 40° C. in order to facilitate mutual dissolution.

TABLE I

Effect of the amount of HEPMA on viscosity

| Comp. | Constituents (parts by weight) | | | | | Viscosity (mPa · s) |
|---|---|---|---|---|---|---|
| | Olig-omer n° 1 | HDDA | Irga-cure 500 | Ebecryl 350 | HEPMA | |
| 1 | 60 | 30 | 5 | 1 | 0 | 1042 |
| 2 | 60 | 30 | 5 | 1 | 10 | 720 |
| 3 | 60 | 30 | 5 | 1 | 20 | 540 |
| 4 | 60 | 30 | 5 | 1 | 30 | 414 |
| 5 | 60 | 30 | 5 | 1 | 40 | 324 |

Table I illustrates very clearly that 2-(2-oxo-1-pyrrolidinyl)ethyl methacrylate has a remarkable ability to reduce the viscosity of radiation curable compositions.

EXAMPLE 2

Effect of 2-(2-oxo-1-pyrrolidinyl)ethyl methacrylate on the reactivity of radiation curable compositions In this example, a comparison is made between the reactivity of various radiation curable compositions containing increasing amounts of HEPMA (according to the invention), and N-vinyl-2-pyrrolidone (by way of a comparison).

A 10 micrometer layer of each of the compositions, whose constituents and amounts (in parts by weight) are indicated in Table II below, is applied to flexible polyvinyl chloride films by means of a bar coater. These films are then passed, at increasing speed and at a distance of 10 cm, under a medium pressure mercury vapor UV lamp (G2M) having a power of 80 W/cm.

The values of two parameters representative of the reactivity of the compositions are then determined.

To measure the "cure speed", in meters per minute, indicated in the penultimate column of the table, the highest rate of passage of the film at which offset occurs is determined.

To measure the "talc speed", in meters per minute, indicated in the last column of the table, the following procedure is used: immediately after passing under the lamp, talc is applied with the finger to half the coated film, after which a piece of absorbent cloth is rubbed lightly five times over the talc-covered part. Then, the two parts are compared under an oblique light. If the coating is well cured, the part treated with talc has the same gloss as the other part and there is no halo at the separation of the two parts. If, on the other hand, the talc treated part has become more matte than the other part, that is because the curing is not complete and the UV dose received is insufficient. The "talc speed" is the maximum speed, expressed in m/minute at which the part treated with talc remains as glossy as the other part.

In Table II, compositions No. 2, 3 and 4 are according to the invention, whilst compositions No. 6, 7 and 8 are introduced by way of comparison.

The results obtained are reported in Table II.

TABLE II

Effect of 2-(2-oxo-1-pyrrolidinyl) ethyl methacrylate on reactivity

| Comp. | Constituents (parts by weight) | | | | | | Cure speed (m/min) | Talc speed (m/min) |
|---|---|---|---|---|---|---|---|---|
| | Oligomer n° 1 | HDDA | Irgacure 500 | Ebecryl 350 | HEPMA | NVP | | |
| 2  | 60 | 30 | 5 | 1 | 10 | —  | 10 | 10 |
| 6* | 60 | 30 | 5 | 1 | —  | 10 | 10 | 5  |
| 3  | 60 | 30 | 5 | 1 | 20 | —  | 5  | 5  |
| 7* | 60 | 30 | 5 | 1 | —  | 20 | 5  | 2.5 |
| 4  | 60 | 30 | 5 | 1 | 30 | —  | 5  | 5  |
| 8* | 60 | 30 | 5 | 1 | —  | 30 | 5  | 2.5 |

*by way of comparison

Table II shows that the reactivity (talc speed) of the compositions according to the invention containing HEPMA is superior to that of compositions not according to the invention containing N-vinyl-2-pyrrolidone (talc speed of 10 m/minute for composition No. 2 containing 10 parts by weight of HEPMA, compared with a talc speed of 5 m/minute for composition No. 6 containing the same quantity of NVP, and a talc speed of 5 m/minute for compositions No. 3 and 4 containing respectively 20 and 30 parts of HEPMA, compared with a talc speed of 2.5 m/minute for compositions No. 7 and 8 containing the same quantities of NVP).

These results indicate a better surface cure when HEPMA is used.

EXAMPLE 3

Abrasion resistance of the cured coatings obtained from compositions containing 2-2-oxo-1-pyrrolidinyl)ethyl methacrylate In this example, a comparison is made between the abrasion resistance of the cured coatings obtained from various radiation curable compositions containing either HEPMA (according to the invention), or NVP (by way of comparison) as reactive diluents.

The compositions are applied by means of a bar coater at a film thickness of 40 micrometers onto flexible polyvinyl chloride films and cured under a UV lamp in the same manner as in Example 2.

In order to evaluate the abrasion resistance, the samples are subjected to the Taber Test: the apparatus used is a "Taber Abraser 5150" fitted with a wheel of the CS-17 type and a weight of 1 kg; the samples to be tested are mounted on a board of the S-36 type; the loss in weight of the sample in milligrams is measured by means of an analytical balance, following 200 and 300 rubbing cycles.

The abrasion resistance is expressed in mg of sample material lost.

The cure speed and the talc speed are also measured according to the tests described in Example 2. In addition, the solvent resistance of the cured coatings is tested; this resistance is expressed as the number of double rubs (to and fro), with a plug of cotton-wool saturated with acetone, which does not alter the appearance of the cured coating.

Viscosity is determined by means of a Brookfield apparatus as in Example I.

In Table III:
the first line gives the number of the composition tested;
the 2nd, 3rd, 4th, 5th, 6th, 7th and 8th lines give the constituents of the compositions and their quantities, in parts by weight;
the 9th line gives the cure speed of the compositions, in m/minute;
the 10th line give the talc speed, in m/minute;
the 11th line gives the solvent resistance (number of double rubs with acetone);
the 12th line gives the viscosity of the compositions, in mPa.s at 25° C.;
the 13th, 14th and 15th lines give the abrasion resistance, in mg of material lost after 200 and 300 rubbing cycles (the sample which shows the lowest loss is the most abrasion resistant).

TABLE III

Abrasion resistance of the cured coatings

| Composition (parts by weight) | 9* | 10 | 11 | 12* | 13 |
|---|---|---|---|---|---|
| Oligomer n° 5 | 70 | 70 | 70 | — | — |
| Oligomer n° 3 | — | — | — | 80 | 80 |
| HDDA | 30 | 30 | 30 | 20 | 20 |
| Ebecryl P115 | — | — | — | 5 | 5 |
| NVP | 10 | — | — | 10 | — |
| HEPMA | — | 10 | 30 | — | 10 |
| Irgacure 500 | 5 | 5 | 5 | 5 | 5 |
| Cure speed (m/min) | 2.5 | 2.5 | 2.5 | 10 | 10 |
| Talc speed (m/min) | 2.5 | 2.5 | 2.5 | 5 | 5 |
| Solvent resistance | >100 | >100 | >100 | >200 | >200 |
| Viscosity (mPa · s at 25° C.) | 210 | 310 | 220 | 2,060 | 1,980 |
| Abrasion resistance (mg) Number of cycles: | | | | | |
| 200 | 6.3 | 5.6 | 5.5 | 3.6 | 2.4 |
| 300 | 13.3 | 11.6 | 9.0 | 7.5 | 5.2 |

*: by way of comparison

In Table III, compositions No. 10, 11 and 13 are according to the invention, whilst compositions No. 9 and 12 are given by way of comparison.

If composition No. 9 is compared with compositions No. 10 and 11, it can be seen that compositions No. 10 and 11, which contain HEPMA, enable to obtain a better abrasion resistance than composition No. 9 containing NVP. In fact, the loss of material is 9.0 mg for composition No. 11 while it is 13.3 mg for composition No. 9, after 300 cycles, and the loss of material is 11.6 mg for composition No. 10 against 13.3 mg for composition No. 9 containing NVP, after 300 cycles.

On the other hand, if compositions No. 12 and 13 are compared, which contain equal quantities of NVP and HEPMA respectively, a better abrasion resistance is also observed for composition No. 13 containing HEPMA than for composition No. 12 containing NVP (5.2 mg of material lost against 7.5 mg respectively, after 300 cycles).

These facts clearly demonstrate that coatings obtained from compositions containing HEPMA resist abrasion better than those obtained from compositions containing NVP, a compound which is currently used in abrasion resistant coatings.

In addition, the cured coatings resist perfectly to more than 100, or even 200, double rubs with a cotton-wool plug saturated with acetone.

EXAMPLE 4

Adhesion of the cured coatings obtained from compositions containing 2-(2-oxo-1-pyrrolidinyl) ethyl methacrylate In this example, a comparison is made between the adhesion of the cured coatings obtained from radiation curable compositions containing increasing quantities of either HEPMA (according to the invention) or NVP (by way of comparison) as reactive diluents.

The compositions are applied by means of a bar coater in a film thickness of 10 micrometers onto poly(ethylene terephthalate) (PET) and polyvinyl chloride (PVC) films. The compositions are then cured under a UV lamp in the same manner as in Example 2.

In order to evaluate adhesion, an adhesive tape of the Tesa 4104 type is applied to the cured film to be tested, which has been previously cross-cut into small squares with 1 mm long sides (cross-cut test), and the adhesive tape is snatched away. The number of squares which are not taken away relative to the number of squares which were initially in contact with the tape is determined; the ratio between these two numbers, expressed in per cent, gives the measure of the adhesion, a ratio of 100% corresponding to perfect adhesion.

The cure speed and talc speed are also measured according to the tests described in Example 2; in addition, the solvent resistance is tested as in Example 3. The viscosity is determined as in Example 1.

In Table IV:

the first line gives the number of the composition tested;
the 2nd, 3rd, 4th, 5th, 6th and 7th lines give the constituents of the compositions and their quantities, in parts by weight;
the 8th line gives the viscosity of the compositions, in mPa.s at 25° C.;
the 9th line gives the cure speed, in m/minute;
the 10th line gives the talc speed, in m/minute;
the 11th line gives the solvent resistance (the number of double rubs with acetone);
the 12th and 13th lines give the adhesion of the coating, in per cent, successively on poly(ethylene terephthalate) (PET) and on polyvinyl chloride (PVC).

TABLE IV

| Adhesion of the cured coatings to plastic films | | | | |
|---|---|---|---|---|
| Composition (parts by weight) | 14* | 15* | 16 | 17 |
| Oligomer n° 6 | 80 | 80 | 80 | 80 |
| HDDA | 20 | 20 | 20 | 20 |
| Irgacure 184 | 3 | 3 | 3 | 3 |
| Darocure 1173 | 3 | 3 | 3 | 3 |
| NVP | 10 | 20 | — | — |
| HEPMA | — | — | 10 | 20 |
| Viscosity (mPa · s at 25° C.) | 1342 | 780 | 2120 | 1540 |
| Cure speed (m/min) | 5 | 5 | 5 | 5 |
| Talc speed (m/min) | 5 | 5 | 2.5 | 2.5 |
| Solvent resistance | >100 | >100 | >100 | >100 |
| Adhesion to PET (%) | 0 | 0 | 0 | 100 |
| Adhesion to PVC (%) | 100 | 100 | 100 | 100 |

*: by way of comparison

In Table IV, compositions No. 16 and 17 are according to the invention, whilst compositions No. 14 and 15 are given by way of comparison.

All the tested compositions exhibit excellent adhesion to polyvinyl chloride. Unlike composition No. 15 which contains 20 parts by weight of NVP, composition No. 17, containing the same quantity of HEPMA, enables to obtain a good adhesion on poly(ethylene terephthalate), but to the detriment of reactivity.

EXAMPLE 5

Mechanical properties of the cured coatings obtained from compositions containing 2-(2-oxo-1-pyrrolidinyl)ethyl methacrylate In this example, a comparison is made between the mechanical properties, i.e. elongation at break, tensile strength at break and Young's modulus, of the cured coatings obtained by means of radiation curable compositions containing either HEPMA (according to the invention) or NVP (by way of comparison), as reactive diluents.

The compositions are applied by means of a bar coater in a film thickness of 100 micrometers, onto tinned steel sheets, and cured under a UV lamp in the same manner as in Example 2.

The values of the three properties studied are measured on specimens of cured film separated from their substrate. The specimens are 100 micrometers thick, 1 cm wide and 3 cm long. The measurements are carried out using an Instron apparatus, and the measures are taken (ASTM D 638-61T) at a traction rate of 50 mm/min at 21° C.

The cure speed and talc speed are also measured according to the tests described in Example 2. In addition, solvent resistance is tested as in Example 3.

The viscosity is determined by means of a Brookfield apparatus as in Example 1.

In Table V:

the first line gives the number of the composition tested;
the 2nd, 3rd, 4th, 5th, 6th, 7th and 8th lines give the constituents of the compositions and their quantities, in parts by weight;
the 9th line gives the viscosity of the compositions, in mPa.s at 25° C.;
the 10th line gives the cure speed of the compositions, in m/minute;
the 11th line gives the talc speed, in m/minute;
the 12th line gives the solvent resistance (number of double rubs with acetone);

the 13th line gives the elongation at break, in per cent;
the 14th line gives the tensile strength at break in MPa;
the 15th line gives the Young's modulus, in MPa.

TABLE V

Mechanical properties of the cured coatings

| Composition (parts by weight) | 18* | 19 | 20 | 21* | 22 |
|---|---|---|---|---|---|
| Oligomer n° 3 | 80 | 80 | 80 | — | — |
| Oligomer n° 1 | — | — | — | 60 | 60 |
| HDDA | 20 | 20 | 20 | 30 | 30 |
| Irgacure 500 | 5 | 5 | 5 | 5 | 5 |
| Ebecryl 350 | — | — | — | 1 | 1 |
| NVP | 10 | — | — | — | — |
| HEPMA | — | 10 | 22 | — | 40 |
| Viscosity (mPa · s at 25° C.) | 1480 | 2324 | 1480 | 1042 | 324 |
| Cure speed (m/min) | 10 | 5 | 5 | 20 | 2.5 |
| Talc speed (m/min) | 5 | 5 | 5 | 15 | 2.5 |
| Solvent resistance | >100 | >100 | >100 | >100 | >100 |
| Elongation at break (%) | 18.8 | 25 | 16.4 | 20.3 | 25 |
| Tensile strength at break (MPa) | 39.4 | 31.5 | 33.4 | 23.2 | 26.9 |
| Young's modulus (MPa) | 767 | 543 | 640 | 340 | 478 |

*: by way of comparison

In table V, compositions No. 19, 20 and 22 are according to the invention, whilst compositions No. 18 and 21 are given by way of comparison.

The results in Table V show that the replacement of N-vinyl-2-pyrrolidone by HEPMA has practically no influence on the mechanical properties of the cured coatings obtained.

Table V also shows that the incorporation of HEPMA in the coatings increases elongation at break, tensile strength at break and the Young's modulus (compare the results obtained with composition No. 22 with those obtained with composition No. 21).

EXAMPLE 6

Rate of incorporation of 2-(2-oxo-1-pyrrolidinyl) ethyl methacrylate in a coating after curing This example shows by two different methods that HEPMA is practically 100% incorporated in a coating cured by ultraviolet radiation.

Method A

Composition No. 23 is prepared according to the invention and contains:

| | Parts by weight |
|---|---|
| Oligomer n° 2 | 60 |
| OTA 480 | 30 |
| HEPMA | 10 |
| Benzophenone | 5 |
| Ebecryl 350 | 1 |

A film of this composition is applied by means of a bar coater in a thickness of 10 micrometers on a polyethylene film which has previously been subjected to a corona discharge treatment. The film is irradiated under a UV medium pressure mercury vapor lamp (80 W/cm) under the same conditions as in Example 2, with a film speed of 5 m/minute.

Extraction tests are then carried out using Maturi cells, according to ASTM standard F34-63T. For this purpose, a film to be tested of 280 cm² is brought into contact with 140 ml of distilled water for 10 days at 40° C. Then, a sample of this liquid is subjected to high performance liquid phase chromatography (HPLC) on a column filled with a C18 reversed phase, with a mixture of water and acetonitrile as eluent. It is not possible to detect HEPMA under these conditions, the detection limit of the apparatus being 50 ppm; HEPMA is thus completely incorporated in the cured film.

Method B

The cured films obtained from compositions No. 18 and 19 of Example 5 are subjected to thermogravimetric analysis. In order to do this, about 50 mg of the sample to be tested is subjected to heating, its temperature being increased gradually from 20° to 80° C., at a rate of 20° C. per minute. The sample is weighed on an analytical balance after reaching the temperatures of 20°, 60° and 80° C., a weight of 100% being assigned to it at 20° C. Under these conditions, the film produced from composition No. 18 (not according to the invention), containing 10 parts be weight of NVP, has a weight of 99.98% at 60° C. and a weight of 99.80% at 80° C. The film produced from composition No. 19 (according to the invention) containing the same amount of HEPMA (instead of NVP), has a weight of 100.0% at 60° C. and 99.94% at 80° C.

Thus the weight loss from the film containing HEPMA is insignificant, the incorporation of HEPMA into the cured film being almost complete. The weight loss from the film containing NVP is somewhat greater, especially at 80° C.

EXAMPLE 7

Other characteristics of a composition containing 2-2-oxo-1-pyrrolidinyl/ethyl methacrylate and of coatings prepared therefrom A radiation curable composition (No. 24) according to the invention, is prepared by mixing together:

| | Parts by weight |
|---|---|
| Oligomer n° 4 | 40 |
| OTA 480 | 10 |
| TPGDA | 12 |
| HEPMA | 18 |
| Ebecryl P115 | 2 |
| Benzophenone | 4 |
| Irgacure 651 | 2 |

This composition is spread on a of flexible polyvinyl chloride film by means of a bar coater at a film thickness of 10 micrometers. UV radiation is then applied by means of a medium pressure mercury vapour lamp (80 W/cm) under the same conditions as in Example 2 (distance of 10 cm).

The cure speed and talc speed are 5 m/minute.

The cured coating resists more than 200 double rubs (to and fro) with a cotton-wool plug saturated with acetone.

Adhesion to PVC, determined by the cross-cut test as in Example 4, is 100%.

The Persoz hardness, determined at 21° C. according to standard NF T 30-016, is 307 seconds.

Stain resistance is determined in the following manner: a drop of an alcoholic iodine solution is deposited on the cured coating; after 1 minute, the drop is wiped away with a piece of cotton saturated with alcohol and the coating is then examined in order to determine whether the alcoholic iodine solution has penetrated into the coating. When applied to composition No. 24 studied in this instance, there is no alcoholic iodine solution absorption. Therefore, its stain resistance is 100%.

Water resistance is also determined by immersing the film for 48 hours in water at 21° C. and then measuring the adhesion of the coating to the substrate by means of the cross-cut test, as in Example 4.

The water resistance thus determined is 100%.

The foregoing results show the very high quality of the cured coatings obtained from compositions according to the invention.

EXAMPLE 8

Characteristics of compositions containing 2-(2-oxo-1-pyrrolidinyl)ethyl acrylate and of coatings prepared therefrom Three radiation curable compositions (No. 25, 26 and 27) according to the invention are prepared, containing 2-(2-oxo-1-pyrrolidinyl)ethyl acrylate (HEPA).

The compositions are applied by means of a bar coater at a film thickness of 10 micrometers to flexible polyvinyl chloride films and cured under a UV lamp in the same manner as in Example 2.

The cure speed and the talc speed are measured by the tests described in Example 2; in addition the solvent resistance is tested as in Example 3. The viscosity is measured by means of a Brookfield apparatus as in Example 1.

In Table VI:
the first line gives the number of the composition tested;
the 2nd, 3rd, 4th, 5th, 6th, 7th and 8th lines give the constituents of the compositions and their quantities, in parts by weight;
the 9th line gives the viscosity of the compositions, in mPa.s at 25° C.;
the 10th line gives the cure speed of the compositions, in m/minute;
the 11th line gives the talc speed, in m/minute;
the 12th line gives the solvent resistance (the number of double rubs with acetone).

TABLE VI

| Compositions containing 2-(2-oxo-1-pyrrolidinyl) ethyl acrylate | | | |
|---|---|---|---|
| Composition (parts by weight) | 25 | 26 | 27 |
| Oligomer n° 1 | 60 | 60 | — |
| Oligomer n° 3 | — | — | 80 |
| HDDA | 30 | 30 | 20 |
| Ebecryl P115 | — | — | 5 |
| Irgacure 500 | 5 | 5 | 5 |
| Ebecryl 350 | 1 | 1 | — |
| HEPA | 10 | 20 | 10 |
| Viscosity (mPa · s at 25° C.) | 754 | 580 | 2000 |
| Cure speed (m/min) | 15 | 15 | 10 |
| Talc speed (m/min) | 10 | 10 | 5 |
| Solvent resistance | >100 | >100 | >100 |

Table VI shows that 2-(2-oxo-1-pyrrolidinyl)ethyl acrylate gives results which are comparable to those obtained with 2-(2-oxo-1-pyrrolidinyl)ethyl methacrylate as far as its ability to reduce viscosity and the reactivity of radiation curable compositions are concerned.

It should also be noted that the cured coatings exhibit excellent resistance to more than 100 double rubs with acetone.

EXAMPLE 9

Characteristics of compositions containing 2-(2-oxo-1-pyrrolidinyl)ethyl methacrylate cured by an accelerated electron beam Composition (No. 28) containing N-vinyl-2-pyrrolidone (by way of comparison) and a composition (No. 29) containing 2-(2-oxo-1-pyrrolidinyl)ethyl methacrylate (according to the invention) are prepared.

These compositions are applied by means of a bar coater at a film thickness of 10 micrometers to flexible polyvinyl chloride films and cured by an accelerated electron beam emitted under a voltage of 175 KeV by means of an ESI-Lab Unit apparatus.

The values of two parameters representative of the reactivity of the compositions, i.e. the cure speed and the talc speed, are then determined. The "cure speed" represents the dose expressed in megarads required to cure the coating to a point such that there is no longer any offset. The "talc speed" represents the dose, expressed in megarads, required to cure the coating, this curing being measured according to the test described in Example 2. Solvent resistance is also tested, as in Example 3.

In Table VII:
the first line gives the number of the composition tested;
the 2nd, 3rd, 4th and 5th lines give the constituents of the compositions and their quantities, in parts by weight;
the 6th line gives the cure speed of the compositions, in megarads;
the 7th line gives the talc speed, in megarads;
the 8th line gives the solvent resistance (the number of double rubs with acetone).

TABLE VII

| Composition (parts by weight) | 28* | 29 |
|---|---|---|
| Oligomer n° 3 | 80 | 80 |
| HDDA | 20 | 20 |
| NVP | 10 | — |
| HEPMA | — | 10 |
| Cure speed (Mrads) | 1 | 1 |
| Talc speed (Mrads) | 2 | 2 |
| Solvent resistance | >100 | >100 |

*: By way of comparison

We claim:

1. A radiation curable composition comprising, per 100 parts by weight, (a) at least 20 parts by weight of at least one radiation polymerizable compound containing at least two groups selected from $CH_2=CH-COO-$ and $CH_2=C(CH_3)-COO-$; and (b) at least one (2-oxo-1-pyrrolidinyl)alkyl acrylate of the general formula:

$$CH_2=C(R_1)-C(=O)-O-R-N\begin{pmatrix} CH_2-CH_2 \\ CH_2-C(=O) \end{pmatrix} \quad (I)$$

wherein R represents an alkylene radical containing 2 to 4 carbon atoms and $R_1$ represents a hydrogen atom or a methyl radical.

2. A composition according to claim 1, wherein the (2-oxo-1-pyrrolidinyl)alkyl acrylate (b) is 2-(2-oxo-1-pyrrolidinyl)ethyl acrylate or methacrylate.

3. A composition according to claim 1, comprising, per 100 parts by weight, 5 to 50 parts by weight of a (2-oxo-1-pyrrolidinyl)alkyl acrylate (b).

4. A composition according to claim 1, wherein compound (a) contains 2 to 15 groups, selected from $CH_2=CH-COO-$ and $CH_2=C(CH_3)-COO-$, per molecule.

5. A composition according to claim 4, wherein the number of said groups, per molecule, is 2 to 6.

6. A composition according to claim 1, wherein compound (a) is a compound selected from the group consisting of the acrylic and methacrylic acid esters of polyhydric alcohols containing 2 to 6 hydroxyl groups.

7. A composition according to claim 1, wherein compound (a) is an oligomer or prepolymer having a molecular weight of less than 10,000.

8. A composition according to claim 7, wherein the oligomer or prepolymer is selected from the group consisting of polyester acrylates, polyester methacrylates, urethane acrylates, urethane methacrylates, epoxy acrylates, epoxy methacrylates, acrylic acrylates and acrylic methacrylates.

9. A composition according to claim 1, further comprising one or more saturated or unsaturated oligomers or polymers different from compound (a).

10. A composition according to claim 9, wherein the said oligomer or polymer different from compound (a) is selected from the group consisting of saturated polyesters, unsaturated polyesters, (moth)acrylic polymers and halogenated polyesters.

11. A composition according to claim 9, comprising said oligomer or polymer different from compound (a), in admixture with at least one compound (a) selected from the group consisting of the acrylic and methacrylic acid esters of polyhydric alcohols containing 2 to 6 hydroxyl groups.

12. A composition according to claim 1 comprising, per 100 parts by weight, 35 to 95 parts by weight of at least one compound (a) containing at least two groups selected from $CH_2=CH-COO-$ and $CH_2=C(CH_3)-COO-$.

13. A composition according to claim 1, further comprising a photoinitiator, and optionally, a tertiary amine as activator.

14. A composition according to claim 13, comprising, per 100 parts by weight, up to 15 parts by weight of the photoinitiator.

15. A composition according to claim 1, further comprising at least one auxiliary constituent selected from additives, fillers, pigments and dyes.

16. A process for coating a substrate, which comprises applying to the surface of said substrate a radiation curable composition according to claim 1 in which the (2-oxo-1-pyrrolidinyl)alkyl acrylates (b) is present in an amount sufficient to produce a composition with a viscosity substantially lower than the viscosity of compound (a), and exposing the said composition to ultraviolet rays or to an accelerated electron beam for a period of time sufficient to form a cured coating.

17. A coating, varnish, paint, ink or adhesive for laminates, curable by ultraviolet irradiation, comprising a composition according to claim 1.

18. A coating, varnish, paint, ink or adhesive for laminates, curable by an accelerated electron beam, comprising a composition according to claim 1.

19. A manufactured article formed using a coating, varnish, paint, ink or adhesive according to claim 17.

20. A manufactured article formed using a coating, varnish, paint, ink or adhesive according to claim 18.

* * * * *